July 28, 1970  R. K. CALVERT  3,521,737

FEED CONTROL SYSTEM

Filed Sept. 26, 1968

INVENTOR
RODNEY K. CALVERT
BY Walter M. Rodgers
ATTORNEY

United States Patent Office 3,521,737
Patented July 28, 1970

3,521,737
FEED CONTROL SYSTEM
Rodney K. Calvert, Dunwoody, Ga., assignor to The Mead Corporation, a corporation of Ohio
Filed Sept. 26, 1968, Ser. No. 762,775
Int. Cl. B65g 47/26
U.S. Cl. 198—34                              5 Claims

ABSTRACT OF THE DISCLOSURE

A feed control system for use in conjunction with high speed packaging machines and the like comprises an infeed conveyor on which articles are transported, metering means engageable with the articles and operable to regulate the speed of movement thereof at a velocity slightly less than that of the conveyor means and accelerating means in the form of an accelerating arm pivotally mounted on the metering means and actuated by a cam and an associated cam follower for engaging preselected articles and for imparting smoothly controlled accelerated movement thereto.

---

Modern high speed packaging machines of the type wherein a group of articles are enveloped by a wrapper blank must be adaptable for use in conjunction with articles of different diameters, heights, weights and the like and must also be capable of forming packages consisting of groups of two or more articles arranged in one or more rows. Of course, the time, expense and technical knowledge required to convert a machine for different uses is a significant element in the cost and efficiency of operation thereof. Significant improvement in the efficiency of conversion of a packaging machine is achieved by adapting the feeding mechanism for the longest package to be accommodated so that shorter packages automatically can be handled. According to this practice, the rate at which articles to be packaged are fed to the packaging machine on the infeed conveyor may approximately equal the velocity of movement of the groups of articles through the machine where the maximum size package is formed. On the other hand, where a shorter package is to be formed and where the infeed conveyor is set for a given velocity of movement, it is necessary to reduce the speed at which items are fed to the packaging machine and also to establish the proper spacing between groups of articles.

According to this invention, the rate at which articles are fed into a packaging machine is controlled at a substantially constant velocity and accelerating means such as an accelerating arm pivotally mounted on a star wheel and cam controlled in accordance with rotary movement of the star wheel is utilized to accelerate movement of the articles by groups to a level in excess of the velocity at which movement is controlled by the star wheel. By this means, velocity of movement is equalized with the speed of movement of the packaging machine and in addition the proper spacing between groups of articles is achieved.

Figure 1:
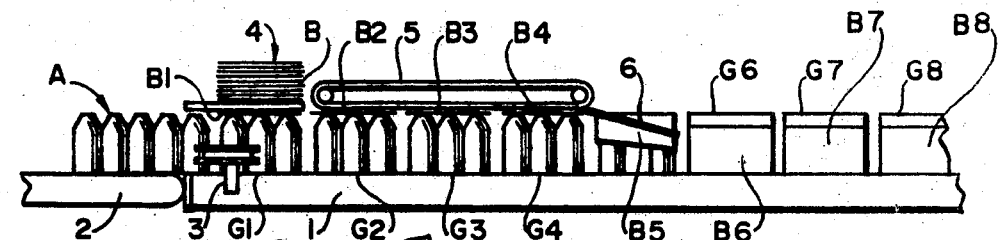
Figure 2:
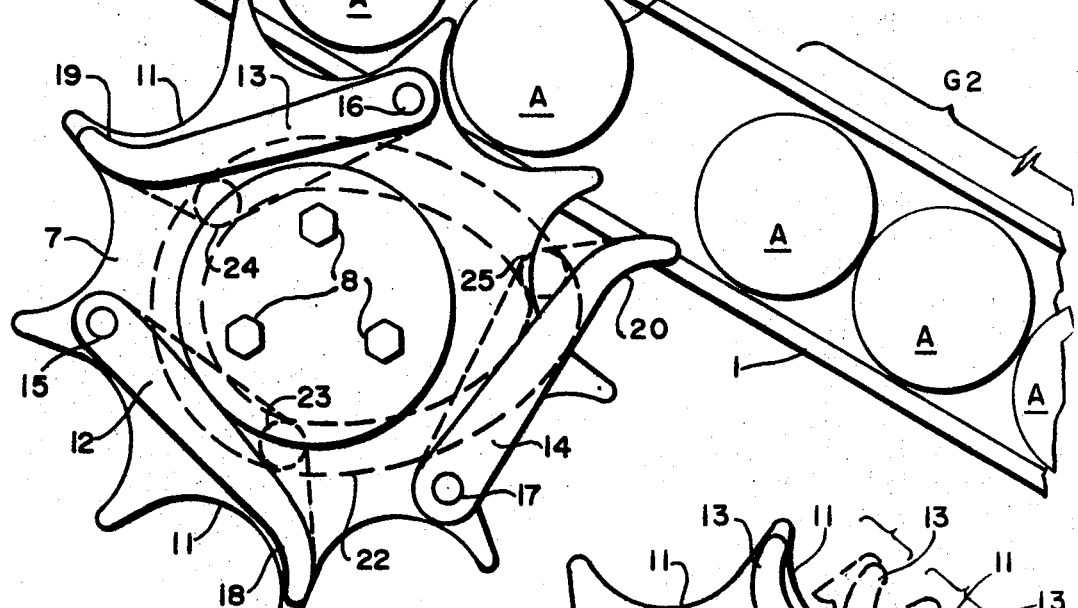
Figure 4:
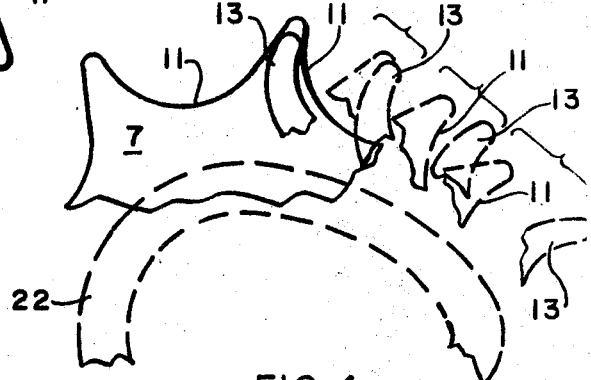
Figure 3:
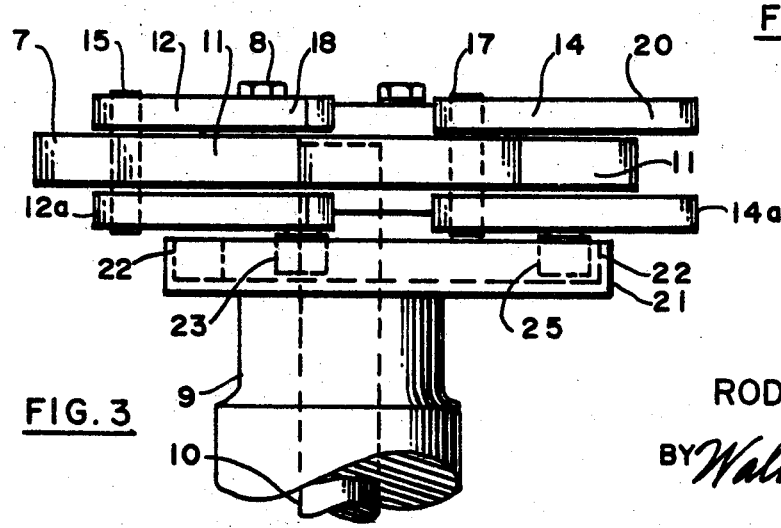

For a better understanding of the invention, reference may be had to the following description taken in conjunction with the accompanying drawing in which FIG. 1 is a schematic side view of a packaging machine of the type to which this invention is applicable; FIG. 2 is a plan view of the combination metering and accelerating means constructed according to the invention and which is employed in conjunction with a machine of the type shown in FIG. 1; FIG. 3 is a side view of the mechanism depicted in FIG. 2 and in which FIG. 4 is an enlarged fragmentary plan view of a portion of the structure depicted in FIG. 2 and constituting a diagrammatic representation of the cooperation between the metering and accelerating means constructed according to the invention.

In FIG. 1, the numeral 1 designates a schematically represented base of a high speed packaging machine of the type in which a group of articles are packaged within a blank of the wraparound type. Articles designated generally by the letter "A" are fed into the machine 1 by an infeed conveyor designated by the numeral 2. The device schematically designated in FIG. 1 by the numeral 3 constitutes the metering and accelerating means constructed according to this invention. The metering and accelerating means 3 controls the velocity of movement of the articles "A" from left to right and also divides the articles "A" into groups such as are indicated in FIG. 1 as "G1–G8" inclusive. As the articles pass through the machine, wrapper blanks "B" are withdrawn from the schematically represented hopper generally designated by the numeral 4 and such blanks are placed atop the groups of articles such as "B1–B8" in sequence as the groups pass underneath the hopper 4. The blanks are held atop their associated groups of articles by suitable hold down mechanism which is of conventional construction and which is designated by the numeral 5 in FIG. 1. Once the blanks are disposed atop their associated article group, they are subsequently folded and secured thereabout in a manner well known in the art, the folding of blank "B–5" being schematically indicated and being effected by a suitable guide or plow generally designated by the numeral 6. Of course the blanks are secured about their associated groups of articles by suitable means in known manner.

In order to regulate the rate of flow of articles "A" into the packaging machine 1, metering means in the form of a star wheel 7 is provided in accordance with this invention. The star wheel is affixed as by bolt 8 to a vertically disposed and rotatable hub 9 mounted on spindle 10. Of course spindle 10 is rotated in synchronism with the packaging machine 1 by suitable known means not shown in the drawing. Thus as the articles "A" reach the star wheel 7 each articles is received within a peripheral recess such as the recesses indicated at 11 on star wheel 7 and rotation of the star wheel determines the velocity of movement from left to right of the articles "A." Preferably and as already explained, the star wheel 7 rotates at such a velocity as is required to reduce the movement from left to right of the articles to a velocity slightly below the speed of movement of conveyor 2.

In order to accelerate the articles moving from left to right to the proper speed required for the packaging machine in a smooth and efficient manner and also in order to provide the necessary and proper spaces between groups of articles, accelerating means is provided according to this invention and such means may take the form of accelerating arms such as 12, 13 and 14 which are pivotally mounted at pins 15, 16 and 17 to the star wheel 7.

As is best shown in FIG. 3, each accelerating arm 12, 13 and 14 in reality is formed of a pair of arms one disposed above the other and the lower arms are designated 12a, 13a and 14a. Of course the lowermost arms such as 12a, 13a and 14a are pivoted to the same pins such as 15, 16 and 17 and are controlled by the same cam followers 23, 24 and 25 as is apparent from FIGS. 2 and 3.

As shown in FIG. 2, each of the accelerating arms 12, 13 and 14 is provided with a curved end portion 18, 19 and 20 which is of a generally comparable configuration to the adjacent and generally coincidental part of the associated recess 11 in star wheel 7. Thus one article "A" enters a particular recess 11 and as the star wheel 7 rotates for a predetermined angle of rotation, the accelerating arms such as 12, 13 and 14 do not affect the movement of the article "A."

In order to impart a smooth acceleration to a particular article such for example as an article which is in engagement at a particular instant with accelerating arm 13, that arm is swung in a clockwise direction relative to star wheel 7 as viewed in FIG. 2 about its pivot 16 to accelerate the associated article. Since there are nine recesses 11 formed in star wheel 7 and since there are only three accelerating arms 12, 13 and 14, it is obvious that the particular accelerating arm such as 13 of necessity imparts accelerating movement to the article directly associated with the curve portion 19 thereof but such accelerating arm also imparts accelerating movement to the two immediately preceding articles. This operation whereby the articles are accelerated in groups establishes the proper spacing between groups of articles such as G1, G2 and the like and also causes the speed of movement of a group such as G1 to accelerate to the speed which is approximately equal to that of the speed of the packaging machine 1 so that undesired collision between machine elements and articles is prevented and inadvertent toppling of the articles is also virtually eliminated.

From the above description it is obvious that if a different number of articles is to be grouped in the particular package group such as G1, a different number of recesses 11 must be formed in the periphery of the star wheel 7. Furthermore, it is obvious that the number of recesses must constitute an even multiple of the number of accelerating arms in accordance with a feature of the invention. Furthermore, it is apparent from the description thus far that the invention is applicable for use in conjunction with articles which are to be packaged as a single row of articles in which event a single mechanism such as that depicted in FIGS. 2 and 3 is employed. If on the other hand two rows of articles are to be packaged, it is necessary to use a second mechanism such as that depicted in FIGS. 2 and 3 on the opposite side of the machine.

For the purpose of imparting accelerating movement to the accelerating arms such as 12, 13 and 14, a fixed cam 21 is employed and is provided with a cam groove 22 together with cam followers 23, 24 and 25 which are pivotally mounted to the accelerating arms 11, 12 and 13 respectively and which are disposed to ride in the cam groove 22. Thus the configuration of cam groove 22 as is best shown in FIGS. 2 and 4 imparts the desired swinging movement to accelerating arms 12, 13 and 14 according to the invention.

Acceleration of a particular article is graphically demonstrated in FIG. 4 wherein schematically shown accelerating arm 13 is depicted in certain positions as indicated by the numerals 13 which positions show displacement relative to the associated recess 11 in the star wheel 7. Thus from FIG. 4, it is apparent that a particular article is accelerated toward the right due to the relative clockwise motion of accelerating arms relative to star wheel 7 in accordance with a feature of this invention.

The embodiments of the invention in which an exclusive property or privilege is claimed are defined as follows:

1. A feed control system for articles said system comprising conveyor means for feeding a plurality of articles along a predetermined path, star wheel metering means engageable with the articles individually for controlling the speed of movement thereof at a substantially constant rate, and accelerating means including an arm pivotally mounted in operative synchronization with said metering means for engaging only one of a group of said metered articles and for increasing the speed of movement of said group along said predetermined path.

2. A system according to claim 1 wherein said metering means normally rotates at a speed such that the velocity of movement of the articles is reduced somewhat below the velocity of movement of said conveyor means and wherein said accelerating means comprises at least one accelerating arm movably mounted on said star wheel.

3. A system according to claim 2 wherein said star wheel is arranged with a number of article engaging recesses which number is an even multiple of the number of accelerating arms mounted thereon.

4. A system according to claim 2 wherein each accelerating arm is provided with a cam follower and wherein a fixed cam is disposed to cooperate with each cam follower to impart article accelerating movement to the associated accelerating arm in coordination with article metering movement of said star wheel.

5. A system according to claim 3 wherein each accelerating arm is pivotally mounted on said star wheel and provided with an article engaging surface of generally comparable configuration to the configuration of said article engaging recesses in said star wheel.

References Cited

UNITED STATES PATENTS

| 2,744,608 | 5/1956 | Ardell et al. | 198—34 XR |
| 2,827,998 | 3/1958 | Breeback | 198—31 |

ALBERT J. MAKAY, Primary Examiner

U.S. Cl. X.R.

53—48; 198—209